(12) United States Patent
Lanzarini et al.

(10) Patent No.: US 12,350,716 B2
(45) Date of Patent: Jul. 8, 2025

(54) METHOD AND SYSTEM OF FEEDING GROUPS OF PRODUCTS TO A PROCESSING UNIT

(71) Applicant: G.D SOCIETA' PER AZIONI, Bologna (IT)

(72) Inventors: Luca Lanzarini, Bologna (IT); Gilberto Spirito, Bologna (IT); Michele Ferrari, Bologna (IT)

(73) Assignee: G.D SOCIETA' PER AZIONI, Bologna (IT)

( * ) Notice: Subject to any disclaimer, the term of this patent is extended or adjusted under 35 U.S.C. 154(b) by 682 days.

(21) Appl. No.: 17/639,889

(22) PCT Filed: Sep. 3, 2020

(86) PCT No.: PCT/IB2020/058204
§ 371 (c)(1),
(2) Date: Mar. 2, 2022

(87) PCT Pub. No.: WO2021/044335
PCT Pub. Date: Mar. 11, 2021

(65) Prior Publication Data
US 2022/0280980 A1    Sep. 8, 2022

(30) Foreign Application Priority Data
Sep. 3, 2019    (IT) .................. 102019000015419

(51) Int. Cl.
*B07C 5/36*        (2006.01)
*B07C 5/38*        (2006.01)
(Continued)

(52) U.S. Cl.
CPC ............... *B07C 5/362* (2013.01); *B07C 5/38* (2013.01); *B25J 9/0093* (2013.01); *B25J 9/1679* (2013.01);
(Continued)

(58) Field of Classification Search
CPC ... B07C 5/362; B07C 5/38; B07C 2501/0063; B07C 5/36; B25J 9/0093; B25J 9/1679;
(Continued)

(56) References Cited

U.S. PATENT DOCUMENTS

| 4,907,398 A | * | 3/1990 | Holze | B65B 5/068 |
| | | | | 53/448 |
| 6,698,158 B2 | * | 3/2004 | Spatafora | B65B 19/32 |
| | | | | 53/151 |

(Continued)

FOREIGN PATENT DOCUMENTS

| CN | 105312244 A | 2/2016 |
| CN | 105424405 B | 12/2017 |

(Continued)

OTHER PUBLICATIONS

International Search Report and Written Opinion for Corresponding International Application No. PCT/IB2020/058204 dated Dec. 11, 2020.

(Continued)

*Primary Examiner* — Thomas Randazzo
(74) *Attorney, Agent, or Firm* — MARSHALL, GERSTEIN & BORUN LLP

(57) ABSTRACT

A method and system of feeding groups of products to a processing unit includes: a tray with a plurality of housings to receive one single product; a conveyor to move the tray along a feeding path; a transfer device to transfer a group of products from respective housings to the processing unit; and an organizing device upstream of the transfer device. The organizing device has: a detection member to detect the presence and position of empty housings and/or housings containing defective products; a gripping member to pick up from or release product into any housing; and a control unit to control the gripping member, based on data received from the detection member, to move one or more products from (Continued)

the respective housings so that defective or missing products are in the housings having the same composition as a group of products to form a group of defective or missing products.

14 Claims, 8 Drawing Sheets

(51) Int. Cl.
    *B25J 9/00*         (2006.01)
    *B25J 9/16*         (2006.01)
    *B25J 15/06*       (2006.01)
    *B65B 35/38*      (2006.01)
    *B65G 47/90*      (2006.01)

(52) U.S. Cl.
    CPC ........... *B25J 15/0616* (2013.01); *B65B 35/38* (2013.01); *B65G 47/905* (2013.01); *B65G 47/907* (2013.01); *B07C 2501/0063* (2013.01)

(58) Field of Classification Search
    CPC .... B25J 15/0616; B65B 35/38; B65G 47/905; B65G 47/907
    See application file for complete search history.

(56) References Cited

U.S. PATENT DOCUMENTS

| | | | |
|---|---|---|---|
| 2016/0361824 A1* | 12/2016 | Ridel | ................... B25J 15/0616 |
| 2021/0016451 A1* | 1/2021 | Maeda | ................. B65G 47/905 |
| 2024/0024920 A1* | 1/2024 | Wagner | ................... B65B 35/24 |

FOREIGN PATENT DOCUMENTS

| | | | | |
|---|---|---|---|---|
| CN | 107667059 A | | 2/2018 | |
| EP | 2757044 A1 | | 7/2014 | |
| WO | WO-2014207073 A1 * | 12/2014 | ............. B07C 5/342 |

OTHER PUBLICATIONS

Chinese Office Action and Search Report Corresponding to Chinese Patent Application No. 202080076178.8 dated Mar. 31, 2023.

* cited by examiner

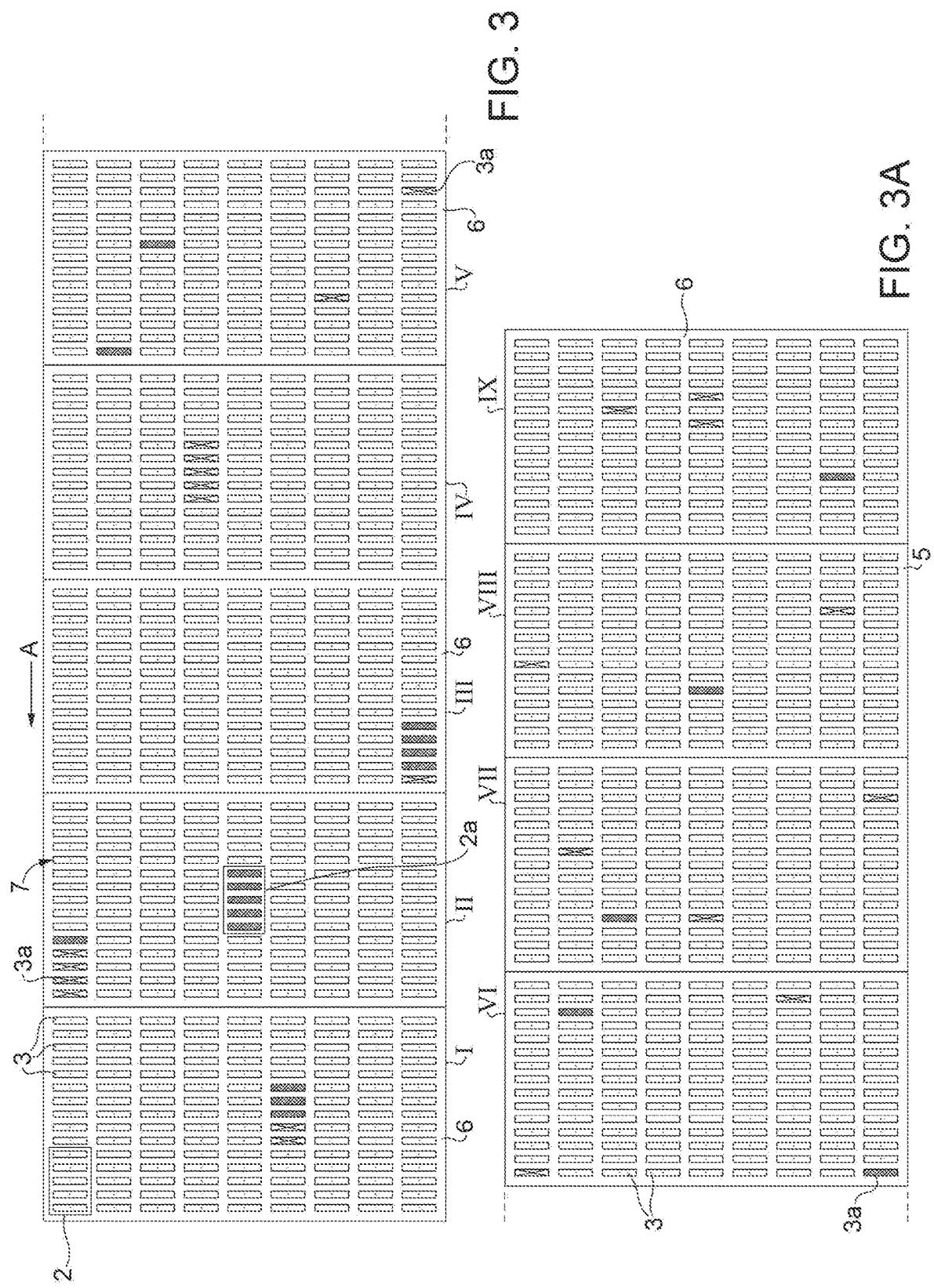

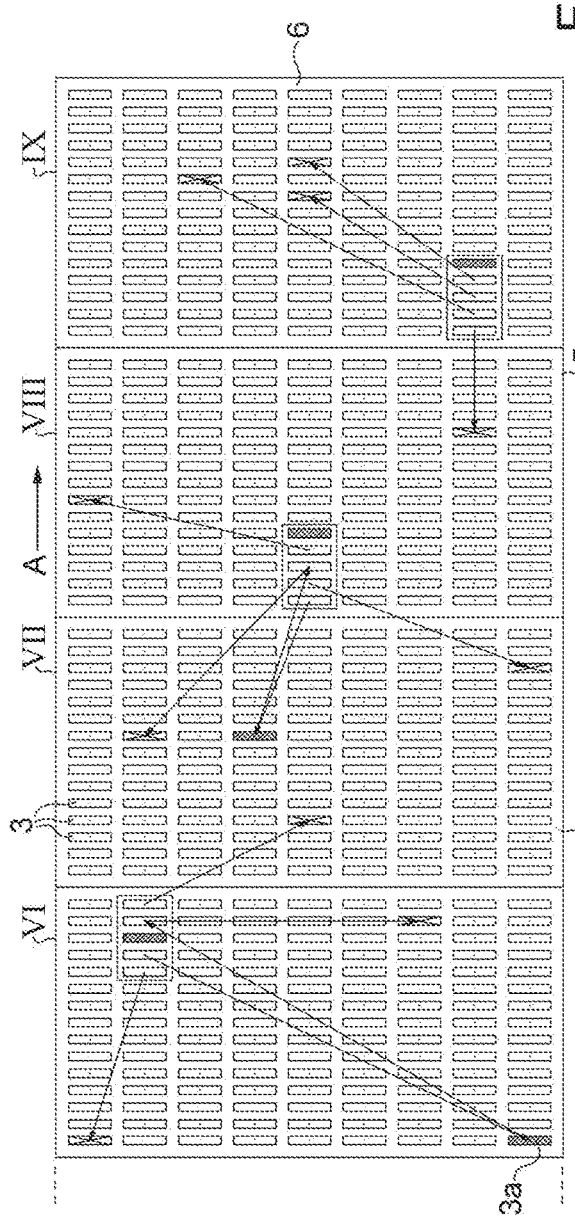
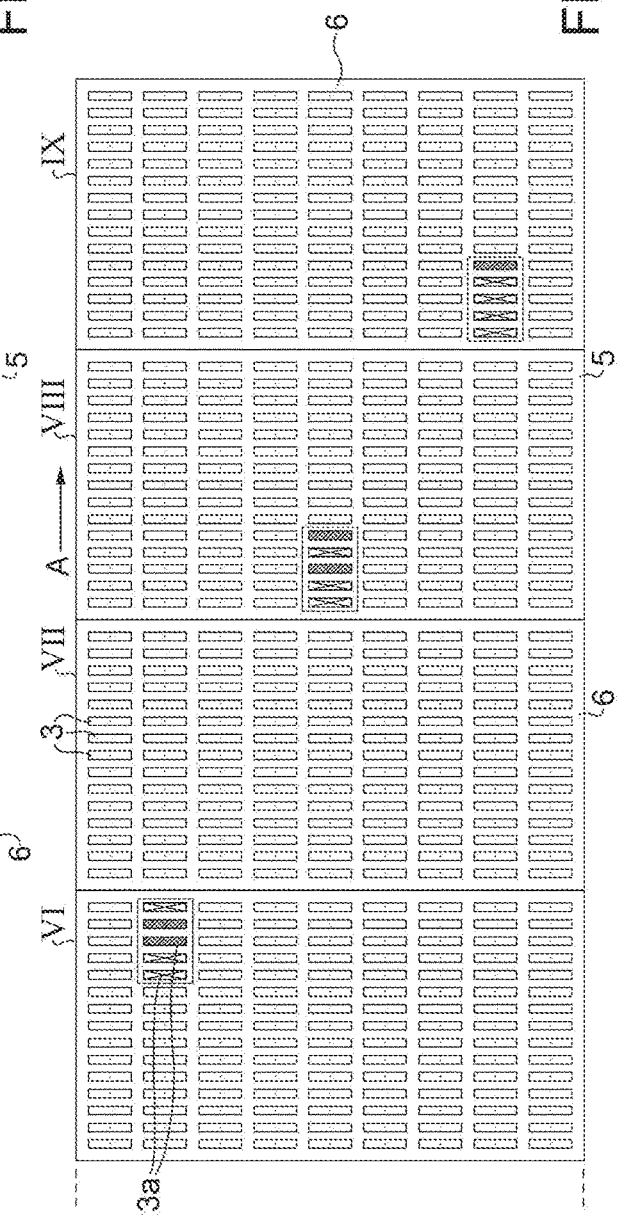

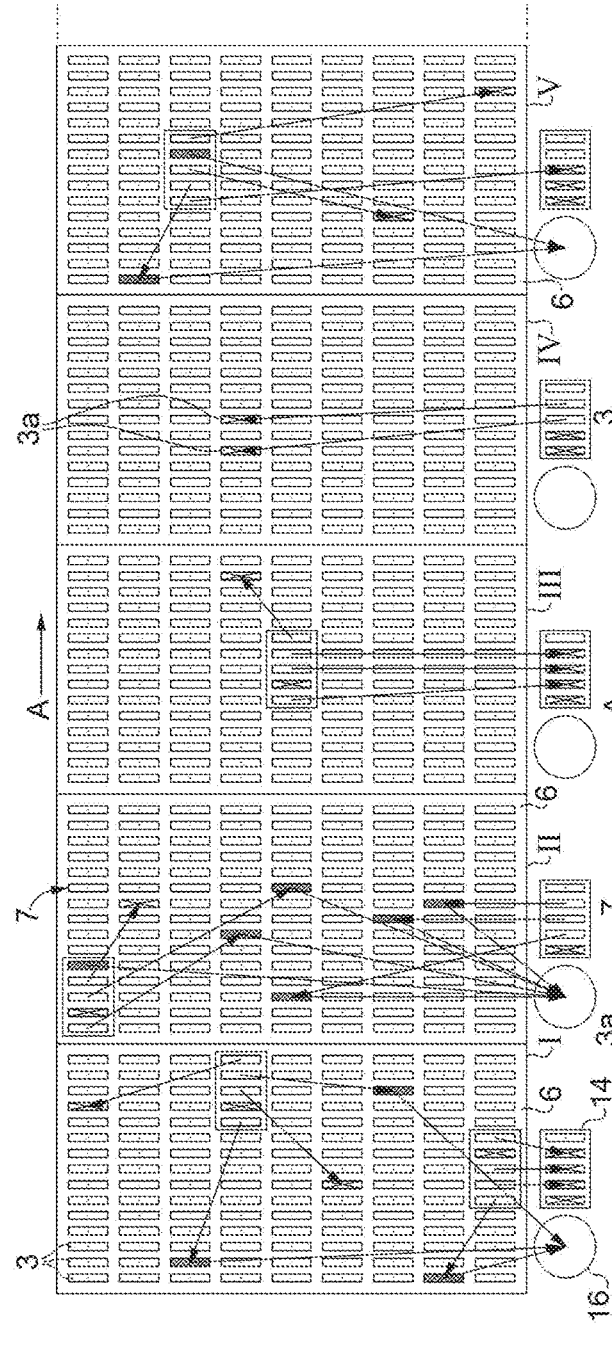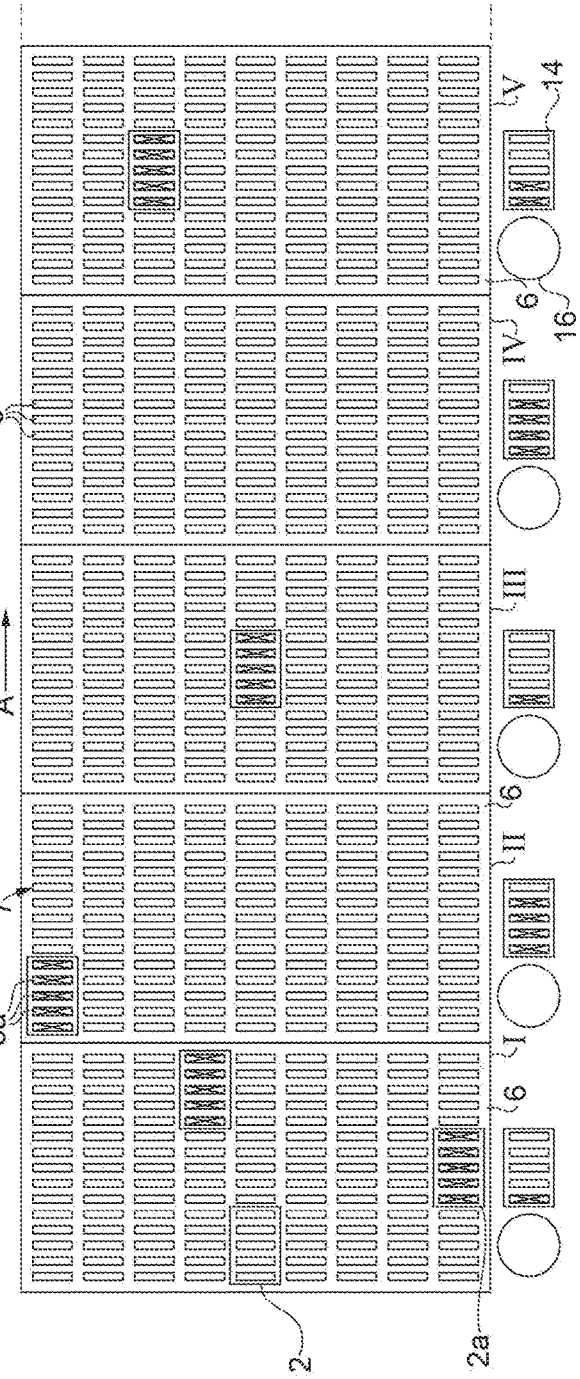

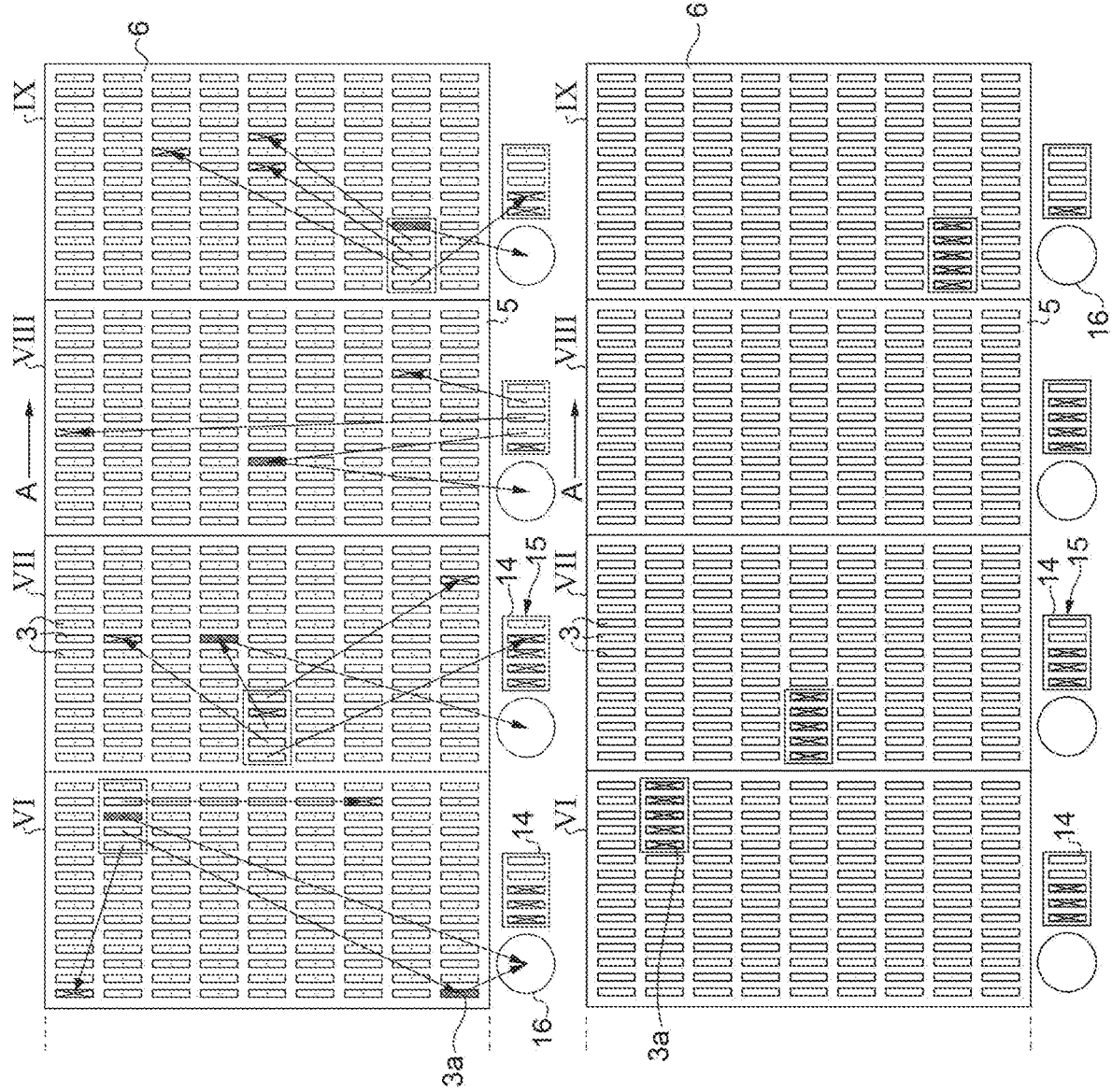

METHOD AND SYSTEM OF FEEDING GROUPS OF PRODUCTS TO A PROCESSING UNIT

This Patent Application is a U.S. national phase of International Patent Application No. PCT/IB2020/058204 filed Sep. 3, 2020, which claims the benefit of priority from Italian patent application no. 102019000015419 filed on Sep. 3, 2019, the respective disclosures of which are each incorporated herein by reference in their entireties.

CROSS-REFERENCE TO RELATED APPLICATIONS

This patent application claims priority from Italian patent application no. 102019000015419 filed on Sep. 3, 2019, the entire disclosure of which is incorporated herein by reference.

TECHNICAL FIELD

The present invention relates to a method and system of feeding groups of products to a processing unit, for example to a machine for packing or filling the same groups of products.

In particular, the products can be products of the tobacco field, such as, for example, electronic cigarettes or cartridges for electronic cigarettes, or products of the pharmaceutical-medical field, such as, for example, bottles, flasks, vials, carpule, or products of the coffee field, such as capsules or pods, and in general any type of product that is intended to be picked up in groups from a station to be transferred to a processing unit, where the entire group of products undergoes specific processing.

The present invention finds advantageous application to a system of feeding groups of products of the tobacco field to a machine for packaging said groups of products in respective packages, to which the following disclosure will make explicit reference without thereby losing generality.

PRIOR ART

A known system of feeding groups of products of the tobacco field to a processing unit provides a conveyor designed to move a plurality of trays along a feeding path and at least one transfer device arranged along the feeding path to transfer the groups of products, each formed by at least two side-by-side products, from the conveyor to the processing unit.

In detail, each of the trays is provided with a plurality of housings each designed to receive one single product and the transfer device is designed to pick up a group of products from the respective housings and to transfer the group of products to the processing unit, for example to a packaging unit.

However, a thus made feeding system has some drawbacks related to the fact that some of the housings of the trays fed by the conveyor along the feeding path could be empty or contain defective products due to anomalies and/or malfunctions of the production stations and/or of the filling stations of the trays arranged upstream of the conveyor. This causes the transfer device, which is configured to act at groups of housings arranged close together in order to pick up the products in groups, to pick up incomplete groups of products (i.e. with fewer products than the number of products intended to form a group) and/or groups of products containing defective products whenever acting at an empty housing and/or a housing containing a defective product.

Said incomplete groups of products and/or groups of products containing defective products once transferred to the processing unit (configured to work on groups of products and not on single products), will inevitably be discarded, before or after being processed. This inevitably also leads to the discarding of non-defective products that are found within incomplete groups of products and/or groups of products containing defective products with consequent waste of said non-defective products and, therefore, with obvious economic disadvantages.

The patent application WO2014207073A1 describes a method and apparatus for organizing plant material units in which the plant material units, after a classification based on image analysis, are transferred from a feeding tray to a plurality of sorting trays by means of a robot arm.

The patent application CN105424405A describes a system for the automated sampling of seeds.

DESCRIPTION OF THE INVENTION

The object of the present invention is to provide a method and system of feeding groups of products to a processing unit which allows to overcome the aforementioned drawbacks and which is simple and inexpensive to produce.

According to the present invention, a method and system of feeding groups of products are provided, as claimed in the attached claims.

The claims describe embodiments of the present invention forming an integral part of the present description.

BRIEF DESCRIPTION OF THE DRAWINGS

The present invention will now be described with reference to the attached drawings, which illustrate some non-limiting embodiments thereof, wherein:

FIGS. 3 and 3A illustrate, on an enlarged scale, two successive portions of the conveyor and of the organizing device of FIG. 2 with a different arrangement of the products in the trays;

FIGS. 4 and 4A illustrate a schematic representation of some possible paths for moving the defective products or the empty housings contained in the trays;

FIGS. 5 and 5A illustrate the trays of FIGS. 4 and 4A after the defective products or the empty housings have been moved along the paths shown in FIGS. 4 and 4A so as to form discard groups;

FIGS. 6 and 6A are views similar to the views of FIGS. 4 and 4A and illustrate a schematic representation of some possible paths for moving the defective products or empty housings contained in the trays; and FIGS. 7 and 7A are views similar to the views of FIGS. 5 and 5A and illustrate the trays of FIGS. 6 and 6A after the defective products or empty housings have been moved along the paths shown in FIGS. 6 and 6A so as to form discard groups.

PREFERRED EMBODIMENTS OF THE INVENTION

Figure 1:
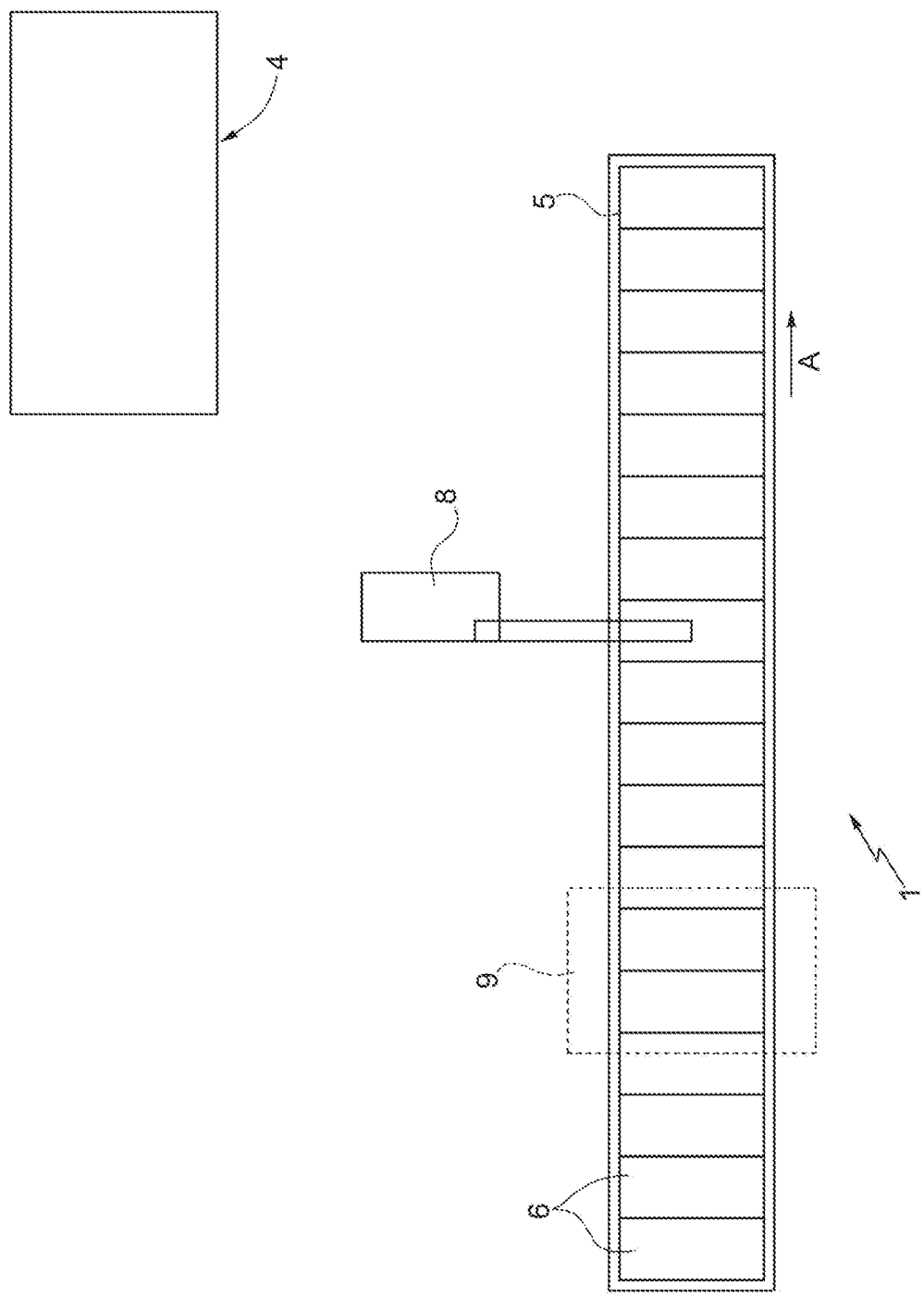
FIG. 1 schematically illustrates a system for feeding a group of products carried by a plurality of trays to a processing unit.

In FIG. 1, number 1 denotes as a whole a feeding system for feeding groups 2 of products 3 to a processing unit 4, for example to a machine for packaging, or for packing, or for filling, the groups 2 of products 3.

Figure 2:
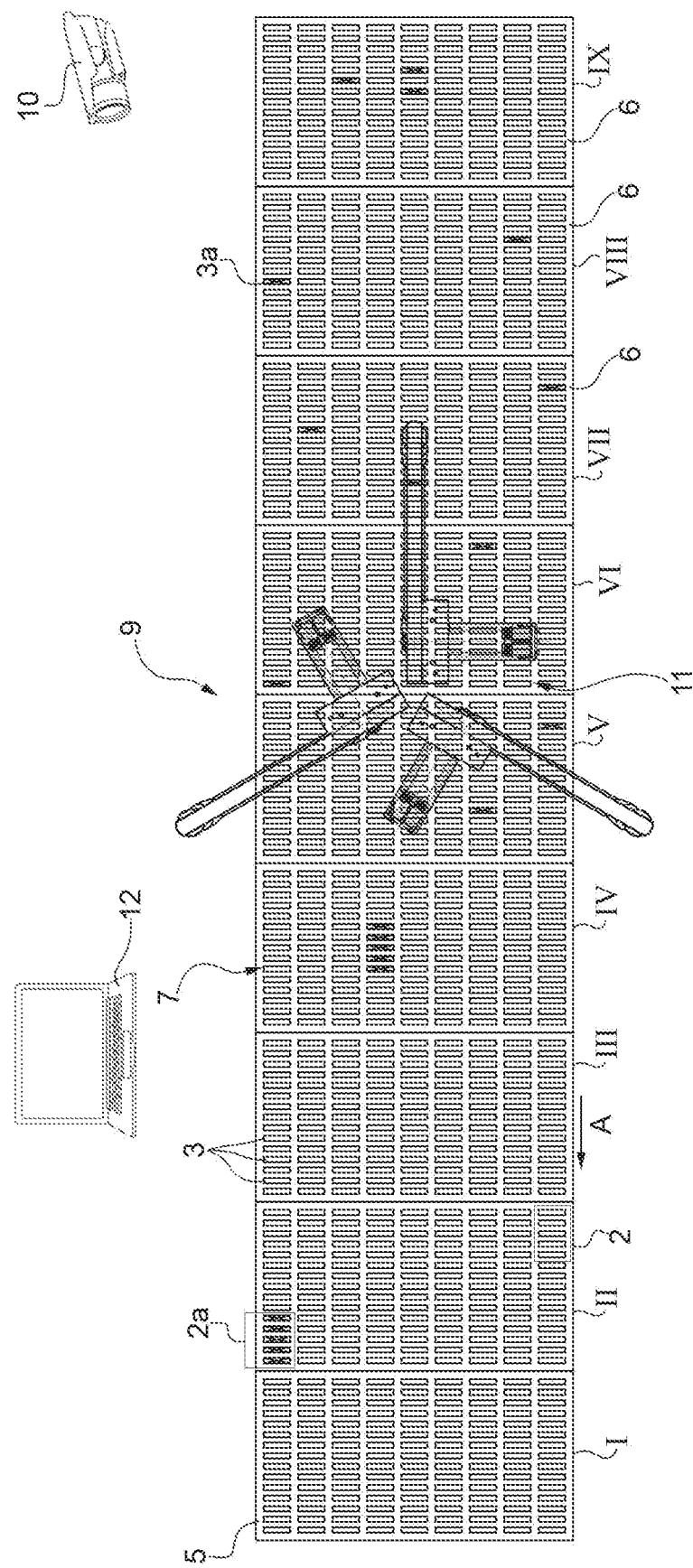
FIG. 2 schematically illustrates a part of the feeding system of FIG. 1, and in particular a conveyor designed to transfer the plurality of trays and an organizing device according to a first embodiment of the invention.

The feeding system 1 comprises a conveyor 5 which carries a succession of trays 6 each containing a plurality of housings 7 (illustrated for example in FIG. 2) each configured to receive one single product 3 (illustrated for example in FIG. 2). In the case illustrated in FIGS. 2, 3, 3A, 4, 4A, 5, 5A, 6, 6A, 7 and 7A, the conveyor 5 carries a plurality of trays 6, in particular nine trays 6, (each of which is associated with a corresponding Roman numeral I, II, III, IV, V, VI, VII, VIII, IX for clarity of representation) each designed to contain from about 50 to about 200 housings 7 (each designed to contain a respective product 3).

The products 3 can be, for example, products 3 of the tobacco field, or products 3 of the medical-pharmaceutical field, or products of the coffee field, or any other type of products 3 intended to be picked up from the respective housings 7 in suitably shaped groups 2 (i.e. having a given number of products 3 and a given arrangement of said products 3) so that they can be subjected to further processing (for example in order to be packaged) by the processing unit 4. In particular in FIGS. 2, 3, 3A, 4, 4A, 5, 5A, 6, 6A, 7 and 7A, each group 2 of products 3 comprises five products 3 arranged in housings 7 aligned one with the other. Alternatively, the groups 2 of products 3 could comprise any number (greater than one) of products 3 variously arranged, provided that these products 3 can be picked up together from the respective housings 7.

In detail, according to what is illustrated in FIG. 1, the conveyor 5 is designed to move the trays 6 along a feeding path A (represented with an arrow in the attached figures) along which a transfer device 8 of a known type is arranged, which is designed to transfer the groups 2 of products 3 to the processing unit 4. The transfer device 8 could be, for example, a robot having, at its head, a plurality of suction units each designed to suck a product 3 from a relative housing 7 so as to be able to simultaneously pick up several products 3.

The feeding system 1 furthermore comprises an organizing device 9 which is arranged along the feeding path A upstream of the transfer device 8 and is designed to organize the products 3 intended to be picked up in groups 2 of products 3 by the transfer device 8.

According to the preferred embodiment illustrated in FIG. 2, the organizing device 9 comprises a detection member 10, for example a camera or a dedicated sensor, which is designed to inspect each tray 6 carried by the conveyor 5 to detect the presence and the position of empty housings 7 (represented with an X in the attached figures) and/or of housings 7 containing defective products 3a (represented with grey housings in the attached figures).

Figure 2A:
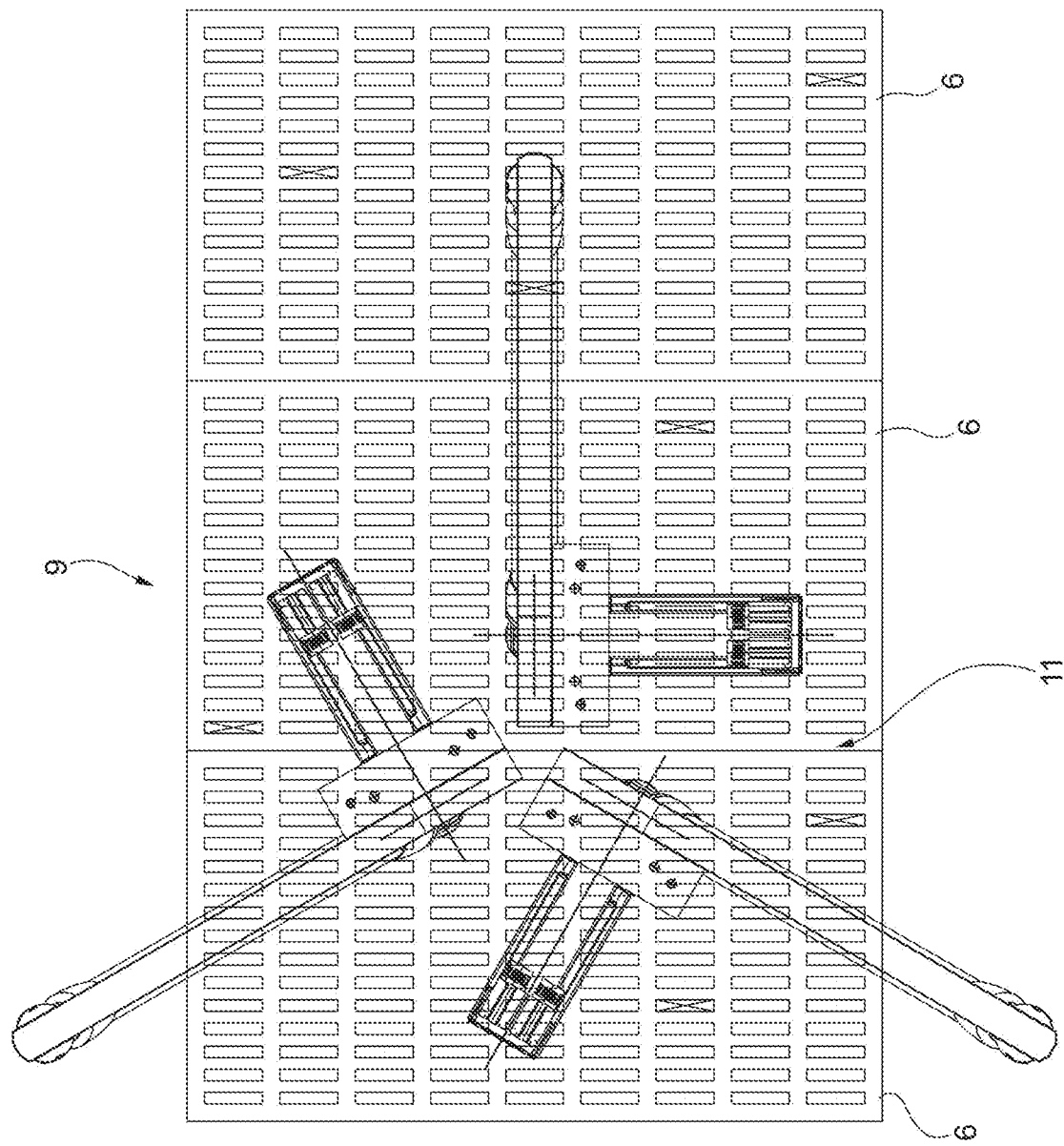
FIG. 2A illustrates, on an enlarged scale, a part of FIG. 2, and in particular a gripping member of the organizing device of FIG. 2.
Figure 4:
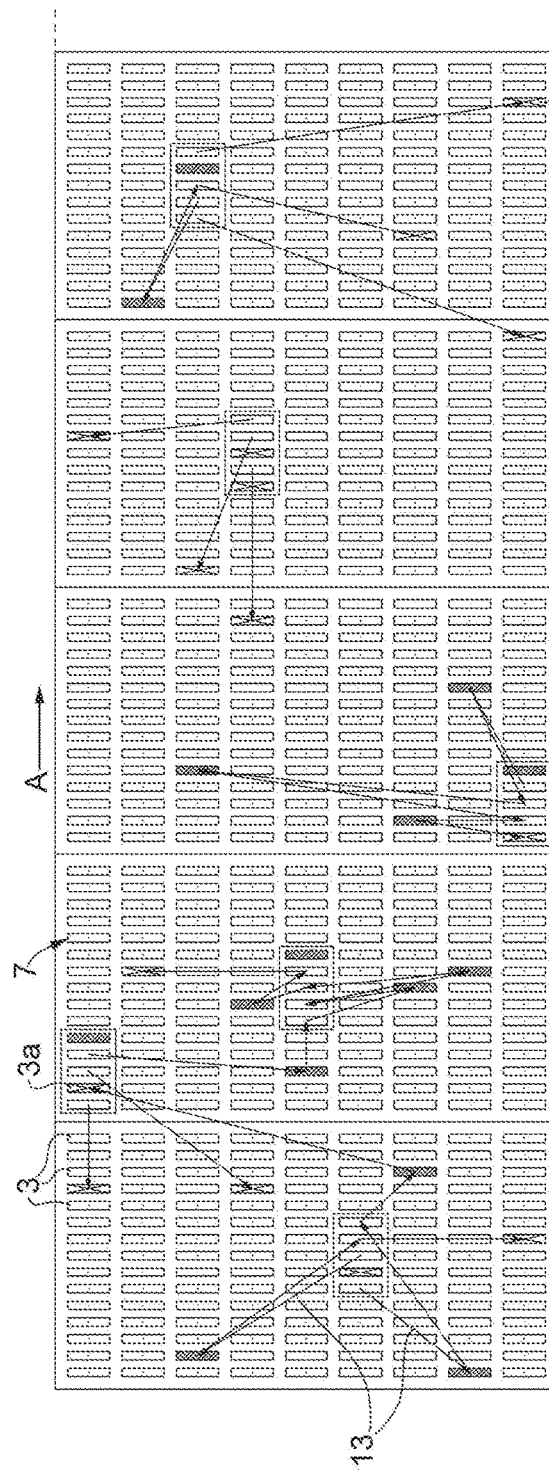
Figure 5:
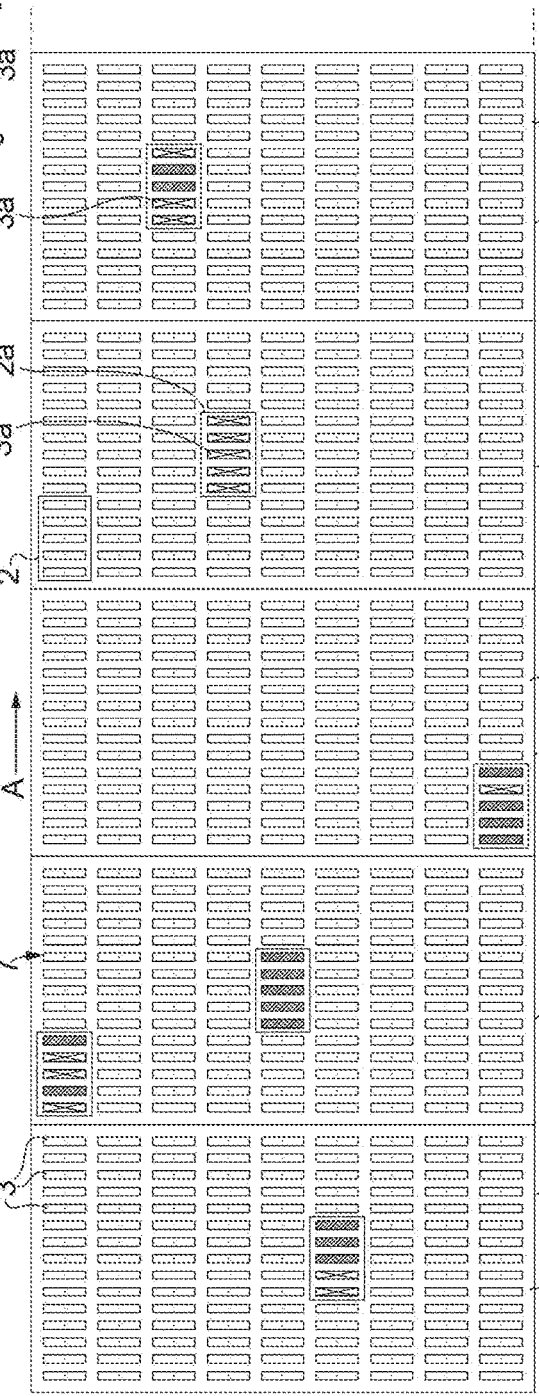

The organizing device 9 furthermore comprises as illustrated in FIGS. 2 and 2A, at least one gripping member 11 arranged along the feeding path A so as to pick up a product 3 from, or to release a product 3 into, any of the housings 7 of at least one tray 6.

In the embodiments illustrated in FIGS. 2 and 2A, the organizing device 9 comprises a gripping member 11 (in particular, the gripping member 11 can be a mechanical gripping member 11 such as a gripper or a suction unit). It is understood that the organizing device 9 could comprise any number of gripping members 11 (even more than one gripping member 11) designed to act on a tray 6 or simultaneously on several trays 6 while the latter advance along the feeding path A, or alternatively when these are stationary in a dedicated work area arranged along the same feeding path A.

The gripping member 11 can be moved above at least a portion of the conveyor 5 so as to be able to pick up a product 3 from, or release a product 3 into, any of the housings 7 of at least one of the trays 6 carried by the conveyor 5.

In detail, according to the embodiment illustrated in FIGS. 6, 6A, 7 and 7A, the gripping member 11 is configured to act on one tray 6 at a time, i.e. it can be moved over an area of dimensions equal to those of a tray 6. Alternatively, in the embodiments illustrated in FIGS. 2, 3, 3A, 4, 4A, 5 and 5A, the gripping member 11 is configured to act simultaneously on two or more successive and side-by-side trays 6.

According to another embodiment of the invention, not illustrated, the transfer device 8 could coincide with the gripping member 11, in other words the gripping member 11 could, after having suitably organized the products 3 of each of the trays 6 as explained in the following, transfer the groups 2 of products 3 from the respective housings 7 to the processing unit 4. For example, the gripping member 11 (coinciding with the transfer device 8) could comprise a plurality of suction units or grippers (not illustrated) which can be activated selectively, so as to use the gripping member 11 both to pick up and subsequently transfer a whole group 2 of products 3 (thus acting as a transfer device 8) and to pick up and transfer one single product 3 from or to any housing 7 (thus acting as a gripping member 11).

Preferably but not exclusively, the gripping member 11 is carried by a delta robot (for example, a three-arm delta robot). According to further embodiments, a delta robot could carry more gripping members 11.

The feeding system 1 furthermore comprises a control unit 12 schematically illustrated in FIG. 2 which receives the data of the detection member 10. In detail, according to the non-exclusive embodiment illustrated in FIG. 2, the detection member 10 is arranged along the feeding path A upstream of the gripping member 11, it is configured to analyze each tray 6 entering the feeding path A so as to identify any empty housings 7 or defective products 3a, and is designed to transfer data (i.e. information about any housings 7 empty and/or containing defective products 3a contained in each tray 6) to the control unit 12.

Alternatively, according to an alternative, not illustrated, the detection member 10 is arranged upstream of the conveyor 5 and is designed to analyze each tray 6 (so as to identify any empty housings 7 or defective products 3a) before the tray 6 arrives at the conveyor 5 so as to then transfer the data to the control unit 12. In this case, each tray 6 is provided with an identification element, for example a unique code or an RFID label, in order to make each tray 6 entering the conveyor 5 identifiable and the organizing device 9 provides a reading member (not illustrated) designed to read the identification element and to track, in this way, the position of each tray 6 (previously analyzed by the detection member 10) along the feeding path A, so that the control unit 12 can uniquely associate the data received from the detection member 10 about each tray 6 (i.e. about the presence and the position of empty housings 7 or defective products 3a in each tray 6) with the position along the feeding path A of each of the analyzed trays 6.

According to a specific embodiment, the detection member 10 can comprise a camera (which, as described above, can be arranged along the feeding path A upstream of the gripping member 11 or can be arranged upstream of the feeding path A) to identify any empty housings 7 of each tray 6 and at least one further sensor, which acts on the products 3 of each tray so as to identify any defective ones (the at least one sensor can also be arranged along the feeding path A upstream of the gripping member 11 or can be arranged upstream of the feeding path A). Both the camera and the at least one sensor transfer data to the control unit 12.

The control unit 12 is configured to control the gripping member 11, based on the data received from the detecting member 10, to move one or more products 3 from the respective housings 7 so that any defective (represented with grey housings in the attached figures) or missing (represented in the attached figures with an X) products 3a are located in respective housings 7 (possibly side-by-side) having the same composition (i.e. the same mutual arrangement and the same number) of products 3 of the group 2 so as to form in at least one tray 6 at least one group 2a of defective and/or missing products 3a (obviously only when there are defective and/or missing products 3a in tray 6). In other words, the organizing device 9 is configured to organize the products 3 and 3a of a tray 6, or alternatively of several successive trays 6, so as to regroup the defective and/or missing products 3a so that the transfer device 8, arranged downstream of the organizing device 9, picks up either groups 2 of products 3, designed for undergoing the appropriate processing in the processing unit 4, or groups 2a of defective and/or missing products 3a and transfers them to a waste unit (not illustrated).

In this way it is possible to eliminate the (negative) fact that the transfer device 8 picks up mixed groups 2 having both products 3 suited to be processed and defective products 3a, and the (negative) fact that the transfer device 8 transfers towards the processing unit 4 incomplete groups 2 (i.e. with a number of products 3 smaller than the number of products 2 which forms each group 2 of products 3) or groups 2a of defective products 3a.

In this regard, according to a preferred but non-limiting embodiment of the invention, the organizing device 9 comprises a memory (not illustrated and of a known type which can be integrated into the control unit 12 when this is a computer, or a tablet), which contains a product 3 and 3a tracking database and the control unit 12 is configured to store in the product 3 and 3a tracking database all the movements to which each product 3 and 3a has been subjected by means of the gripping member 11. In this way, based on the data contained in the product 3 and 3a tracking database, it will be possible to know the presence but also the position of the groups 2a of defective and/or missing products 3a to be discard.

In detail, according to a first embodiment, the control unit 12, based on the data contained in the product 3 and 3a tracking database (i.e. known the presence and the position of the groups 2a of defective and/or missing products 3a to be discarded), directly controls the transfer device 8 so as to transfer the groups 2 formed by products 3 to the processing unit 4, and transfer the groups 2a formed by defective and/or missing products 3a to the discard unit.

Alternatively, the feeding system 1 comprises a further control unit (not illustrated) which is designed to control the transfer device 8 and which communicates with the control unit 12; in particular, in this case, the control unit 12 is preferably configured to transfer the data contained in the product 3 and 3a tracking database to the further control unit so that this can, based on said data, control the transfer device 8 in order to transfer the groups 2 formed by products 3 to the processing unit 4, and to transfer the groups 2a formed by defective and/or missing products 3a to the discard unit. Also in this case, each tray 6 is preferably provided with an identification element, for example a unique code or an RFID label, so as to make identifiable each tray 6 which advances along the feeding path A and is provided with a reading device (not illustrated) designed to read the identification element and to track the position of each tray 6 along the feeding path A, in order to uniquely associate the data regarding each tray 6 with the position of the tray 6 itself along the feeding path A.

Furthermore, in order to optimize the operation of the feeding system 1, and in particular of the organizing device 9, by minimizing the time necessary for the organization of the products 3 and 3a, the control unit 12 is preferably configured, based on the data received from the detection member 10, to identify all the possible moving paths 13 of the gripping member 11 designed to form at least one group 2a of defective or missing products 3a and to move the gripping member 11 along the moving path 13 which provides the smallest number of movements of products 3 and 3a and/or the smallest number of movements of the gripping member 11 and/or the shortest movements of the gripping member 11 and/or the shortest time needed.

In the non-limiting embodiment illustrated in FIG. 2, the control unit 12 is contained inside a computer arranged externally to the conveyor 5; however, the control unit 12 could be arranged anywhere in the feeding system 1, for example it could coincide with the control unit of the entire product 3 production line.

According to an alternative embodiment of the invention illustrated in FIGS. 6, 6A, 7 and 7A, the organizing device 9 furthermore comprises an exchange element 14, which is provided with a plurality of housings 15 and is arranged beside the conveyor 5 in the working area of the gripping member 11 (i.e. within the area in which the gripping member 11 can be moved). Furthermore, the organizing device 9 comprises a waste area 16 arranged beside the conveyor 5 and beside the exchange element designed to receive the defective products 3a from the housings 7 of the trays 6. In an alternative embodiment, the organizing device 9 comprises an exchange element 14 and a waste area 16 for each tray 6, arranged beside the conveyor 5 in the area of a respective tray 6. In any case, the gripping member 11 will be movable (also at one or more trays 6 carried by the conveyor 5) also in the area of the exchange element 14 and the waste area 16 (or at least one of the exchange elements 14 and at least one of the waste areas 16). In this case, in fact, the gripping member 11 is designed to move a defective product 3a from a housing 7 of a tray 6 to the waste area 16 and a product from a housing 15 of the exchange element 14 to an empty housing 7 of a tray 6.

In other words, the waste area 16 is designed to receive the defective products 3a from the housings 7; subsequently, the empty housings 7 generated by the removal of the defective products 3a will eventually be filled with products 3 arranged in the housings 15 of the exchange element 14.

Advantageously, the exchange element 14 can be used to contain stocks of products 3 to be transferred from the housings 15 to the housings 7, so as to fill any empty housings 7.

Alternatively, the exchange element 14 can also be used as a stock of products 3 and 3a. In detail, the exchange element 14 can be used to complete a group 2a of defective and/or missing products 3a to be discarded, by transferring a defective product 3a from a housing 15 to a housing 7 (for example, when missing only one product 3a to form a group 2a of defective and/or missing products 3a to be discarded with the same composition of a group 2), or the exchange element 14 can be used to fill empty housings 7 by transferring a product 3 from a housing 15 to a housing 7. In this case, a waste area 16 may or may not be provided.

In the non-limiting embodiment illustrated in FIGS. 6, 6A, 7 and 7A, the exchange element 14 has a number of housings 15 different from the number of housings 7 of a tray 6, in detail less than the number of housings 7 of a tray 6. In particular in the embodiment illustrated in FIGS. 6, 6A, 7 and 7A, the exchange elements 14 contain a composition of housings 15 analogous to that of the groups 2 and 2a, i.e. in the specific case each containing five housings 15 side-by-side one another. Preferably, the number of housings 15 of the exchange element 14 is equal to at least half the number of products that form a group 2, 2a.

Furthermore, in the preferred embodiment illustrated in FIGS. 6, 6A, 7 and 7A, the exchange element 14 is firmly fixed beside the conveyor 5.

Alternatively, according to an embodiment not illustrated, the exchange element 14 (i.e. each of the exchange elements 14) is formed by a tray 6 which is temporarily laid beside the conveyor 5, i.e. which is transferred, for example by the same transfer device 8, or alternatively by another transfer device, towards a position external to the conveyor 5 (obviously still reachable by the gripping member 11) so as to act as an exchange element 14. In this case, therefore, the exchange element 14 (i.e. each of the exchange elements 14) has a number of housings 15 equal to the housings 7 of a tray 6.

With reference to the embodiment illustrated in FIG. 2, the trays 6 moving along the feeding path A have housings with missing products illustrated with X. Instead, with reference to the embodiment illustrated in FIGS. 3 and 3A, the trays 6 in feeding along the path A have both housings with missing products illustrated with X and housings with defective products illustrated with grey. With reference to both FIG. 2 and FIGS. 3-3A, the trays I, II, III, IV were subjected to the action of the gripping member 11 and the groups 2, 2a were formed while the trays V, VI, VII, VIII and IX have not yet been subjected to the action of the gripping member 11.

It is understood that the conveyor 5 could be of any type, a conveyor belt, a roller conveyor or a semi-rigid chain in which a plurality of trays 6 are fixed.

Furthermore, according to a further embodiment not illustrated, each tray 6 could be integral with the conveyor 5, i.e. the conveyor 5 could be a semi-rigid belt provided with a plurality of indentations which form the above-described housings 7.

According to a further aspect of the present invention, a method of feeding to feed groups 2 of products 3 to a processing unit 4 is provided. The method provides a conveying step during which at least one tray 6 is moved along a feeding path A, a transfer step during which at least a group 2 of products 3 formed by at least two products 3 is transferred from respective housings 7 of the tray 6 to the processing unit 4, and a detection step during which the tray 6 is inspected to detect the presence and the position of empty housings 7 and/or housings containing defective products 3a.

The method of feeding comprises, after or simultaneously with the detection step and before the transfer step, an organization step of the products 3 and 3a, during which, based on the data collected during the detection step, one or more products 3 and 3a are moved from the respective housings 7 so that possible defective or missing products 3a are in respective housings 7 having the same composition as a group 2 of products 3 in order to form, in the tray 6, at least one group 2a of defective or missing products 3a to discard.

According to the preferred embodiment of the method illustrated in the attached figures, a plurality of trays 6 are conveyed during the conveying step and, the transfer step and the organizing step can occur simultaneously with the conveying step but involving trays 6 arranged in different points of the feeding path A. In other words, some trays 6 could simultaneously undergo the transfer step, while the trays 6 further upstream along the same feeding path A could undergo the organization step.

The method of the invention is preferably but not exclusively feasible by means of the feeding system 1 of the invention.

The embodiments described herein can be combined with each other without departing from the scope of the present invention.

The method of feeding and the feeding system 1 for feeding groups 2 of products 3 to a processing unit 4 of the present invention have numerous advantages.

Firstly, the method of feeding and the feeding system 1 described above allow to minimize (cancel) the waste of products 3, making the feeding system 1 more efficient, since they prevent non-defective products 3 from being discarded only because picked up together with defective products 3a, or because they are part of incomplete groups 2a and, on the other hand, by appropriately organizing the products 3 before they are picked up by the transfer device 8, they allow to speed up the subsequent processing to which the groups 2 of products 3 are subjected, as it will no longer be necessary to check that there are no waste products before starting these processes, or after carrying them out.

Furthermore, the method of feeding and the feeding system 1 described above are relatively cheap and simple to implement. In particular, as regards the feeding system 1, it will be sufficient to insert, in the known feeding systems 1, at least one gripping member 11 upstream of the transfer device 9 and a control unit 12 suitably configured to control the gripping member 11.

The invention claimed is:

1. A feeding system (1) for feeding groups (2) of products (3) to a processing unit (4); the feeding system (1) comprises:
   at least one tray (6) provided with a first plurality of housings (7) each designed to receive one single product (3);
   a conveyor (5) designed to move the at least one tray (6) along a feeding path (A);
   a transfer device (8), which is arranged along the feeding path (A) and is designed to transfer a group (2) of products (3) from respective housings (7) of the at least one tray (6) to the processing unit (4);
   an organizing device (9), which is arranged along the feeding path (A) upstream of the transfer device (8) and comprises: a detection member (10) which is designed to detect the presence and the position of empty housings (7) and/or housings (7) containing defective products (3a), and at least one gripping member (11) which is adapted to be operated so as to pick up a product (3, 3a) from, or release a product (3, 3a) into, any of the first plurality of housings (7) of the at least one tray (6); and a control unit (12), which is configured to control the at least one gripping member (11), based on data received from the detection member (10), in order to move one or more products (3) from the respective housings (7) so that possible defective or missing products (3a) are in the respective housings (7) having a composition that is the same, as a group (2) of products (3) so as to form, in the at least one tray (6), at least one group (2) of defective or missing products (3a).

2. The feeding system (1) according to claim 1, wherein the transfer device (8) is designed to transfer a group (2) of defective products (3a) from the respective housings (7) of the at least one tray (6) to a waste unit.

3. The feeding system (1) according to claim 1, wherein the organizing device (9) is designed to operate with two or more successive trays (6) fed by the conveyor (5) along the feeding path (A).

4. The feeding system (1) according to claim 1, wherein the control unit (12) is configured to identify, based on the data received from the detection member (10), all possible moving paths (13) of the at least one gripping member (11) suitable to form, in the at least one tray (6), at least one group (2a) of defective or missing products (3a) and to move the at least one gripping member (11) along the moving path (A) involving one or more of a smallest number of movements of products (3), a smallest number of movements of the at least one gripping member (11), shortest movements of the at least one gripping member (11) and a shortest time needed.

5. The feeding system (1) according to claim 1, wherein:
 a memory is provided, which contains a product (3, 3a) tracking database; and
 the control unit (12) is configured to store, in the product (3, 3a) tracking database, all the movements to which each product (3, 3a) was subjected by the at least one gripping member (11).

6. The feeding system (1) according to claim 1, wherein the organizing device (9) comprises a plurality of gripping members (11).

7. The feeding system (1) according to claim 1, wherein the at least one gripping member (11) is moved by a delta robot.

8. The feeding system (1) according to claim 1, wherein the organizing device (9) comprises an exchange element (14), which is arranged beside the conveyor (5) and is provided with a second plurality of housings (15), each designed to receive one single product (3).

9. The feeding system (1) according to claim 8, wherein the exchange element (14) is firmly arranged in a fixed position beside the conveyor (5).

10. The feeding system (1) according to claim 8, wherein the exchange element (14) has a smaller number of the second plurality of housings (15) than the number of the first plurality of housings (7) of the at least one tray (6).

11. The feeding system (1) according to claim 8, wherein the exchange element (14) is made by the at least one tray (6) which is temporarily laid beside the conveyor (5).

12. The feeding system (1) according to claim 8, wherein the organizing device (9) comprises a waste area (16), which is arranged beside the conveyor (5) and is designed to receive defective products (3a) from the first plurality of housings (7) of the at least one tray (6).

13. The feeding system (1) according to claim 12, wherein the at least one gripping member (11) is designed to move a defective product (3a) from one of the first plurality of housings (7) of the at least one tray (6) to the waste area (16) and is designed to move a product (3) from one of the second plurality of housings (15) of the exchange element (14) to one of the first plurality of housings (7) of the at least one tray (6).

14. A method of feeding for feeding groups of products (3) to a processing unit; the method comprises:
 a conveying step, during which at least one tray (6) provided with a plurality of housings (7), each designed to receive one single product (3), is moved along a feeding path (A);
 a transfer step, during which at least one group of products (3) formed by at least two products (3) is transferred from respective housings (7) of the at least one tray (6) to the processing unit (4);
 a detection step, during which the presence and the position of empty housings (7) and/or housings (7) containing defective products (3a) is detected; and
 a product (3) organization step, which is prior to the transfer step and subsequent to, or at least simultaneous with, the detection step and during which, based on data collected during the detection step, one or more products (3, 3a) are moved from the respective housings (7) so that possible defective or missing products (3a) are in the respective housings (7) having a composition that is the same, as a group (2) of products (3) so as to form, in the at least one tray (6), at least one group (2) of defective or missing products (3a).

\* \* \* \* \*